Jan. 7, 1941.  H. J. HOOD  2,227,973
TRANSPARENCY SLIDE HOLDER
Filed Feb. 9, 1939
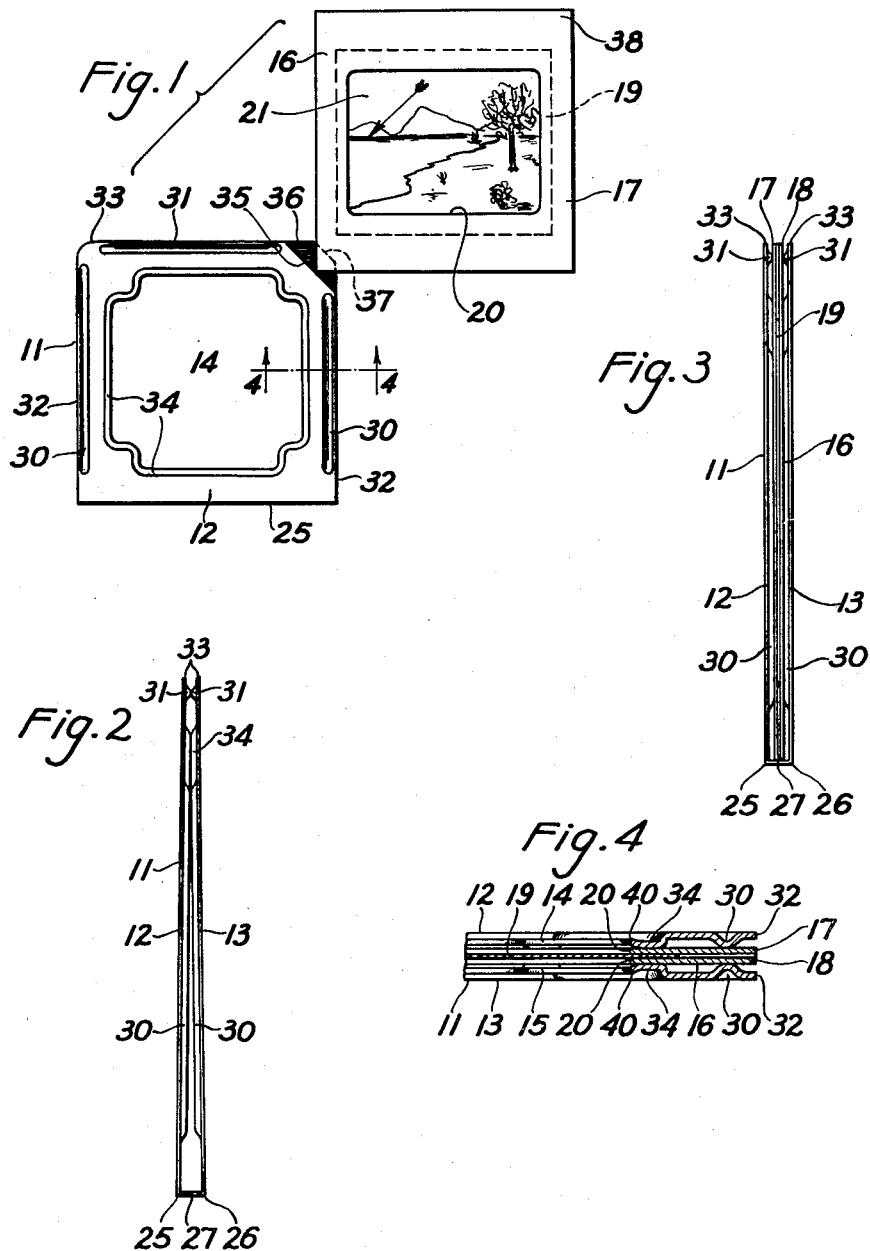
Henry J. Hood
INVENTOR Patented Jan. 7, 1941

2,227,973

UNITED STATES PATENT OFFICE 2,227,973

TRANSPARENCY SLIDE HOLDER

Henry J. Hood, Rochester, N. Y., assignor to Eastman Kodak Company, Rochester, N. Y., a corporation of New Jersey Application February 9, 1939, Serial No. 255,475

4 Claims. (Cl. 88—26)

The present invention relates to picture projecting devices, and more particularly to a transparency slide holder for such devices.

One object of the invention is the provision of a slide holder which is of rugged construction, and affords adequate protection for the transparency slide positioned therein.

Another object of the invention is the provision of a holder in which the slides are removably positioned so that the holder may be used with a number of individually mounted films or transparencies.

A further object of the invention is the provision of a holder which is so formed as to facilitate the ready insertion and removal of a transparency slide or mount.

A still further object of the invention is the provision of a holder, of the class described, which is formed of resilient material so as to yieldably engage and retain the slide in position therein.

A still further object of the invention is the provision of a holder of the class described which is simple in construction, relatively inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is a front elevation view of a slide holder constructed in accordance with the present invention, the transparency slide or mount to be positioned in the holder being shown partially inserted therein;

Fig. 2 is a side elevation view of the holder illustrated in Fig. 1, but on a larger scale than the latter, showing the relation of the holder reenforcing ribs and how the latter retain the holder parts in spaced relation to facilitate insertion of the transparency slide therein;

Fig. 3 is a view similar to Fig. 2, but with a transparency slide in position in the holder; and Fig. 4 is a horizontal view taken substantially on the line 4—4 of Fig. 1, but on a larger scale than the latter, showing the manner in which the reenforcing ribs on the holder resiliently engage and retain the slide in position in the holder.

Similar reference numerals throughout the various views indicate the same parts.

The holder, generally indicated by the numeral 11, Fig. 1, is formed from a single strip of sheet material, preferably thin flexible metal, to provide a pair of overlying flaps or members 12 and 13 having registering apertures 14 and 15 respectively, of the shape shown in Fig. 1. These flaps are adapted to engage opposite sides or faces of a transparency slide 16 when the latter is positioned in the holder 11, as shown in Figs. 3 and 4 and to be later described.

The slide 16 does not, however, constitute a part of the present invention, and may be formed of two sheets 17 and 18 of heavy paper which are adhesively or otherwise secured together to retain the film or transparency 19 therebetween. Suitable apertures 20 are provided in the sheets 17 and 18 so as to frame the image-bearing portion 21 of the film 19, as shown in Fig. 1.

The lower edges 25 and 26 of the members 12 and 13 are connected by a cross member or bottom plate 27 which cooperates with the members 12 and 13 to provide a holder which is U-shaped in cross section, as is apparent from an inspection of Figs. 2 and 3. The plates 12 and 13 extend upwardly in converging relation from the bottom 27, as shown in Fig. 2. As the plates are formed of resilient materials they tend to move into engagement when the holder is empty, see Fig. 2. When, however, the slide 16 is inserted, as shown in Fig. 3, the plates 12 and 13 are sprung or forced apart, as later explained, a distance sufficient to accommodate the slide 16. The holder may thus be broadly considered as a U-shaped spring clip, the plates 12 and 13 of which are flexibly connected along one edge only. For this reason the members 12 and 13 may be considered as spring members which yieldably retain the slide 16 in position in the holder.

As the material from which the above holder is formed is of thin flexible material, reenforcing means are preferably provided to impart the desired rigidity to the holder. This reenforcing means comprises, in the present embodiment, inwardly projecting embossings or ribs 30 and 31 formed adjacent the side and upper edges 32 and 33 respectively of the plates 12 and 13, as shown in Fig. 1. In addition, an inwardly extending annular rib 34 extends all the way around the apertures 14 and 15, as clearly shown in Fig. 1. These ribs 30, 31 and 34 thus impart the desired rigidity to the entire holder.

The ribs 31 on the two plates 12 and 13 are preferably in alignment and thus serve to retain the top edges 33 of the plates in slightly spaced relation when the holder is empty, as shown in Fig. 2, so that the slide 16 may be readily inserted therebetween. To facilitate the insertion or removal of the slide 16, one upper corner 35 of the plate 14 is cut away to expose a small portion 36 of the other plate 13, as shown in Fig. 1.

The complementary corner 37 of the plate 13 may be also cut away slightly so that the corner 38 of the slide 16 will project therebeyond when the slide is in position in the holder, as is obvious.

The insert the slide, the lower left-hand corner is placed on the exposed portion 36 of the plate 13, as shown in Fig. 1. As the plates 12 and 13 are held in spaced relation by reason of the engaging ribs 31, see Fig. 2, the slide 16 may be readily inserted between the plates by moving the slide downwardly and to the left, in the direction of the arrow, Fig. 1, until the bottom edge of the slide rests on the bottom member 27 of the holder, as shown in Fig. 3. In this position the image bearing portion 21 of the transparency 19 is now in registry with the apertures 14 and 15 of the plates 12 and 13.

As pointed out above, the ribs 31 not only serve to maintain the plates 12 and 13 in spaced relation to facilitate insertion of the slide, but also cooperate with the embossings or ribs 30 and 34 to provide the desired rigidity to the plates 12 and 13. In addition, these reinforcing ribs engage opposite sides of the slide 16 to retain the latter in position in the holder 11, as best shown in Fig. 4. As the plates 12 and 14 constitute spring members, the ribs 30, 31 and 34 yieldably engage the slide 16 to provide, in effect, a spring clip for securing the slide in position. In order to prevent any possibility of the slide 16 catching on the marginal edges of the apertures 14 and 15 during the inserting operation, the edges of these apertures are slightly flared out, as shown at 40, Fig. 4.

The above described holder is of such a thickness that the transparency 19 is maintained in the same plane it would occupy if positioned in the usual glass mount in which the transparency is retained between glass slides or cover plates. In addition, the use of such a holder avoids the necessity of re-focusing the projector when changing from such glass mounts to the present holder. Finally, the holder of the present invention is of the same thickness as, and may be interchangeably used in projectors primarily designed for use with, such glass mounts.

It is thus apparent from the above description that the present invention provides a slide holder which acts much in the same manner of a spring clip to yieldably engage and retain the transparency slide in position, yet permit easy and ready insertion or removal of the slide from the holder. The holder is of simple yet rugged construction and is also relatively inexpensive to manufacture.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A slide holder comprising a resilient clip formed to provide a pair of plates secured together along one edge only, said plates having registering apertures and converging toward the edges opposite said one edge to provide spring members which are adapted to be forced apart when a transparency slide is inserted therebetween, means on said plate adjacent said opposite edges to retain the latter in spaced relation to facilitate the insertion of said slide between said plates, and means on said spring members adapted to yieldably engage and retaining said slide in position in said holder.

2. A slide holder comprising a pair of thin plates of resilient material formed from a single strip and flexibly secured together along one edge, registering apertures formed in said plates, and inwardly extending reinforcing ribs formed on said plates adjacent the edges thereof, certain of the ribs of one plate being adapted to contact certain of the ribs of the other plate to retain the edges of said plates opposite said one edge in spaced relation to facilitate the insertion of a transparency slide between said plates, said insertion serving to slightly spring said plates apart so that said ribs may yieldably engage said slide to retain the latter in position in said holder.

3. A slide holder comprising a resilient clip formed to provide a pair of overlying plates secured together along one edge only, said plates being formed with registering apertures and arranged to converge toward the edges opposite said one edge to provide a pair of spring members which are adapted to be forced apart when a transparency slide is inserted therebetween, means on said member for retaining said opposite edges in spaced relation, a corner of one of said plates projecting beyond the adjacent corner of the other plate to permit the ready insertion of a corner of said slide between said spaced opposite edges to facilitate the positioning of said slide between said members, and means on said plates adapted to yieldably engage said slide to retain the latter in position in said holder.

4. A slide holder comprising a resilient clip formed to provide a pair of overlying plates secured together along one edge only, said plates being formed with registering apertures and arranged to converge toward the edges opposite said one edge to provide a pair of spring members which are adapted to be forced apart when a transparency slide is inserted therebetween, inwardly extending reinforcing ribs formed on said plates adjacent the edges thereof, the ribs adjacent said opposite edges being positioned to contact so as to retain said opposite edges in slightly spaced relation, a corner of one of said plates on said opposite edges projecting beyond the complementary corner of the other plate to permit the ready insertion of a corner of said slide between said spaced edges to facilitate loading of said holder, and means cooperating with said ribs for retaining said slide in position in said holder and in registry with said aperture.

HENRY J. HOOD.